United States Patent
Bendel et al.

(10) Patent No.: US 8,096,759 B2
(45) Date of Patent: Jan. 17, 2012

(54) BULKHEAD OF A WIND TURBINE

(75) Inventors: Urs Bendel, Fockbek (DE); Carsten Eusterbarkey, Simonsberg (DE); Peter Quell, Osterronfeld (DE)

(73) Assignee: Repower AG, Hamburg (DE)

( * ) Notice: Subject to any disclaimer, the term of this patent is extended or adjusted under 35 U.S.C. 154(b) by 1092 days.

(21) Appl. No.: 11/943,021

(22) Filed: Nov. 20, 2007

(65) Prior Publication Data

US 2008/0118365 A1 May 22, 2008

(30) Foreign Application Priority Data

Nov. 21, 2006 (DE) .......................... 10 2006 055 091

(51) Int. Cl.
*F03D 11/00* (2006.01)
(52) U.S. Cl. ........................................ 415/201; 416/248
(58) Field of Classification Search ........................ None
See application file for complete search history.

(56) References Cited

U.S. PATENT DOCUMENTS

| | | | |
|---|---|---|---|
| 7,470,111 B2 | 12/2008 | Schubert | |
| 7,614,850 B2 * | 11/2009 | Rogall | ...................... 416/244 R |
| 2006/0120862 A1 * | 6/2006 | Jannasch et al. | .............. 415/175 |

FOREIGN PATENT DOCUMENTS

| | | |
|---|---|---|
| DE | 29817382 U1 | 4/1999 |
| DE | 202004003521 U1 | 6/2004 |
| DE | 10337534 A1 | 3/2005 |
| EP | 1596064 A2 | 11/2005 |
| NL | 1021673 * | 10/2002 |
| WO | 00/60719 A1 | 10/2000 |
| WO | 2004/090326 A1 | 10/2004 |

* cited by examiner

*Primary Examiner* — Richard Edgar
(74) *Attorney, Agent, or Firm* — Rankin, Hill & Clark LLP

(57) ABSTRACT

A bulkhead for a wind turbine is provided. The wind turbine includes a rotor hub and a rotor blade operatively attached to the rotor hub. The rotor blade includes a blade root. The bulkhead includes multiple access openings with closable hatches and is arranged in or on the blade root or in the area between the blade root and the rotor hub.

17 Claims, 2 Drawing Sheets

BULKHEAD OF A WIND TURBINE

BACKGROUND OF THE INVENTION

The invention relates to a rotor blade and a bulkhead for a wind turbine. More specifically, the invention relates to the arrangement of the bulkhead with respect to the rotor blade.

BRIEF SUMMARY OF THE INVENTION

Wind turbines are commonly known in the art and have at least one rotor blade arranged on a rotor hub. For safety reasons, a bulkhead is formed in the blade root of the rotor blade, so that appropriately positioned personnel can stand on the bulkhead and perform maintenance work in the rotor hub or in the rotor blade.

In order to get to the rotor blade from the rotor hub, the bulkhead generally has a hatch or an access hatch in the middle of the bulkhead.

DE 20 2004 003 521 U1 describes a rotor hub that is walkable on the inside, which has a reinforcing bulkhead arranged in the area of its ring flange. This reinforcing bulkhead has an access opening for maintenance personnel in the middle.

Based on this state of the art, the object of the present invention is to further develop a bulkhead of a wind turbine so that the bulkhead can also be used with rotor blades having a larger blade diameter.

It is another object of the present invention to improve access to the rotor blade in the event of an injury to personal working on the rotor blade.

It is yet another object of the present invention to improve maintenance accessibility to the rotor blade.

The object is solved through a bulkhead, which has at least two access openings, of a wind turbine whereby the bulkhead is or will be arranged in or on the blade root of a rotor blade or in the area between the blade root of a rotor blade and a rotor hub.

Due to the fact that the at least two access openings are designed respectively formed in the bulkhead in the passage between the rotor hub and the rotor blade in the event of an accident involving a person who entered the rotor blade through one access opening, it is possible for a rescuer to enter the rotor blade via the second access opening in order to save the person involved in the accident. This provides a faster and safer option for saving people from the rotor blade. This considerably increases the safety measures of the wind turbine.

Each of the access openings are dimensioned such that a person can climb or get from the rotor hub to the rotor blade when the rotor blade is positioned appropriately. In order to stand safely on the bulkhead, the access opening have corresponding hatch flaps so that the bulkhead serves as a working platform in the case of maintenance work.

Moreover, access to rotor blades from the rotor hub is facilitated when several access openings are provided on the bulkhead. For example, during production of large rotor hubs and large rotor blades with a blade root diameter of approximately 3 m the access options and maintenance are facilitated.

The access hatches are thereby arranged at correspondingly preferred locations, preferably outside the center of the bulkhead, so that maintenance personnel can easily open a closure hatch on the access opening and climb through it into the rotor blade. In particular, the access openings are positioned such that access is correspondingly simplified.

Moreover, it is provided in a preferred embodiment that at least one access opening is arranged outside of the center of the bulkhead or between the center of the bulkhead and a peripheral edge of the bulkhead. The center of the bulkhead is understood to be the point, through which the rotor blade rotational axis or the rotor blade longitudinal axis runs diagonal, in particular horizontal, to the plane of the bulkhead.

Facilitated access to the rotor blade results in particular when several access openings are designed or provided on an outer peripheral edge of the bulkhead.

It is particularly preferred if at least two access openings, relating to the center of the bulkhead or the rotational axis of the rotor blade, are offset with respect to each other at a predetermined angle between 45° and 180°. Preferred angles between two access openings are in particular angles of 90° and 180°.

A simplified maintenance of a rotor blade results when the access openings are or will be arranged in the area of the nose of the rotor blade and/or in the area of the pressure side of the rotor blade and/or in the area of the suction side of the rotor blade, preferably on the edge of the rotor blade.

The bulkhead is formed in particular in a circular manner, wherein the bulkhead is or will be connected with the rotor blade and/or the rotor hub via corresponding flange connections or the like.

One advantage of the bulkhead according to the invention having several access opens results in particular when the bulkhead has a diameter of more than 2 m, in particular more than 2.5 m, preferably more than 3.0 m. This makes it possible to provide even larger wind turbines, in which the rotor blades have a rotor blade diameter of more than 2 m, 2.5 m, 3 m or more with the bulkhead according to the invention. Thus, the maintenance of the rotor blades or even the saving of people involved in accidents is easier.

Moreover, the access openings are designed respectively formed in a closable manner. Corresponding closure devices are commonly used and known to a person skilled in the art.

The object is also solved by a rotor blade, which is designed with a bulkhead according to the invention. Within the framework of the invention, it is also possible that a corresponding rotor hub as well as a rotor, which has at least one rotor blade and a rotor hub, are or will be provided with a bulkhead according to the invention.

Moreover, the object is further solved through an arrangement of a bulkhead on or in a rotor blade of a wind turbine in the area of the blade root or on a rotor hub of a wind turbine or through an arrangement of a bulkhead in the area between a rotor blade and a rotor hub. The preceding embodiments of the bulkhead are referenced for further detail and in order to avoid repetitions.

The invention is described below, without restricting the general intent of the invention, based on exemplary embodiments in reference to the drawings, whereby we expressly refer to the drawings with regard to the disclosure of all details according to the invention that are not explained in greater detail in the text.

Additional benefits and advantages of the present invention become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form part of the specification.

DETAILED DESCRIPTION OF THE INVENTION

In the following figures, the same or similar types of elements or corresponding parts are provided with the same reference numbers thereby preventing the item from being reintroduced.

Figure 1:
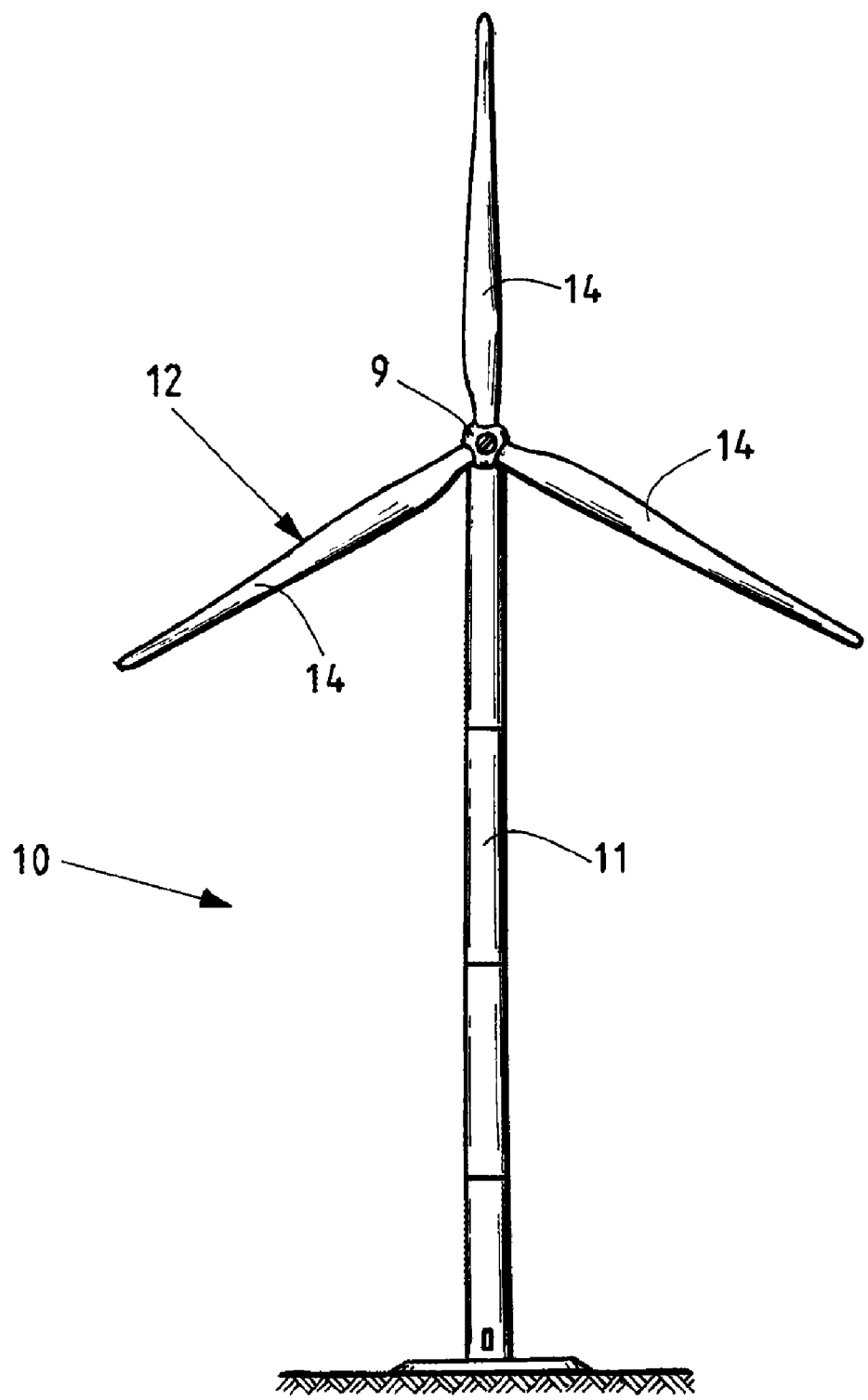
FIG. 1 shows a schematic representation of a wind turbine.

FIG. 1 shows a schematic representation of wind turbine 10. The wind turbine 10 has a tower 11 and a rotor 12, which comprises three rotor blades 14 attached to a rotor hub 9. The rotor hub 9 is connected to a rotor shaft. When the wind blows, the rotor 12 turns in a known manner. Power from a generator connected to the rotor 12 or to the rotor hub 9 and the rotor shaft can thereby be created and delivered to a consumer network.

Figure 2:
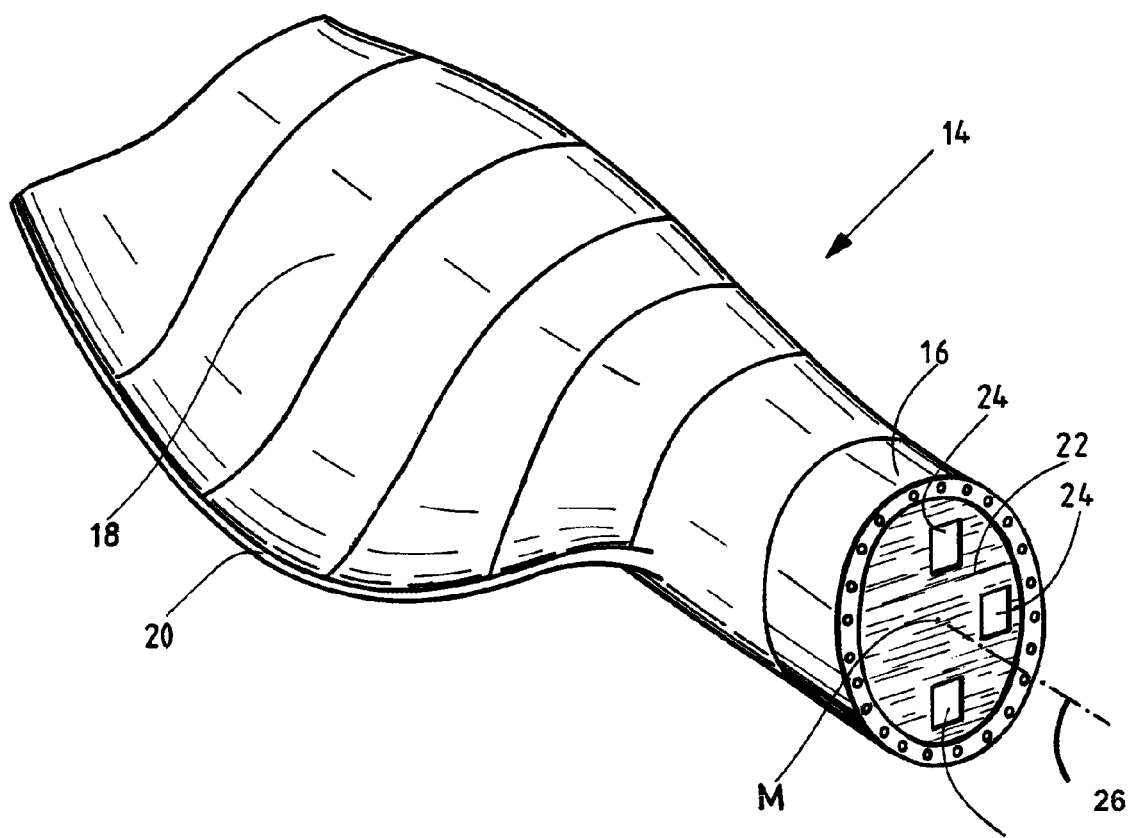
FIG. 2 shows a perspective view of a rotor blade with a bulkhead according to the invention.

FIG. 2 shows a perspective view of a lower section of the rotor blade 14. The rotor blade 14 has a so-called rotor blade root 16, which has a generally circular shaped cross section on the side facing the rotor hub 9. The rotor blade 14 is hollow inside and includes a pressure side 18 and an opposite suction side (not shown). The rotor blade 14 is designed in a profiled manner between the rotor blade root 16 and the rotor blade tip.

The corresponding rotor blade 14 profiles along the longitudinal axis of the rotor blade 14 run together on the rear edge 20 of the rotor blade 14. A bulkhead 22 is arranged in the rotor blade 14 in the area of the rotor blade root 16, wherein it is possible in one embodiment to glue the bulkhead 22 into the rotor blade root 16. The bulkhead 22 is permanently mounted on the rotor blade root 16 or inserted into the blade root 16.

The bulkhead 22 is also formed in a circular manner and has three access openings 24, which are arranged outside the center point M of the bulkhead 22. The access openings 24 are dimensioned such that a person can climb into the interior of the rotor blade 14 after opening a hatch on the access opening 24 of the rotor hub.

Due to the fact that several access openings are formed on the bulkhead 22, a simpler and safer entrance and exit on the rotor blades 14 is also ensured for rotor blade roots 16 with large diameters, such as for example larger than 2 m or 2.5 m or 3.0 m.

The bulkhead 22 prevents a falling in of objects or persons from the rotor hub 9 into the rotor blade 14 and also seals the rotor blade 14 from the rotor hub 9 with respect to dirt and/or humidity. At the same time, the bulkhead 22 can be used as a corresponding work platform for maintenance work on the rotor hub 9 or on the rotor blade 14. The access openings 24 are arranged in a spaced manner on the outer circumference of the bulkhead 22, wherein the access openings 24 are arranged in an offset manner at a 90° angle. It is thereby possible to arrange the access openings 24 in a corresponding 12 o'clock, 3 o'clock and 6 o'clock position (or 3 o'clock, 6 o'clock, 9 o'clock position) if the rotor blade 14 is mounted with the front edge, i.e. with the approach side when the rotor blade 14 is arranged horizontally, on the wind turbine for maintenance work. These positions correspond with the arrangements of the access openings in the area of the pressure side 18, the nose and the suction side.

Moreover, the rotational axis 26 of the rotor blade 14 is indicated in FIG. 2 with a dashed and dotted line, which in the geometric sense horizontally penetrates the bulkhead 22 at point M.

While specific embodiments of the invention have been described and illustrated, it is to be understood that these embodiments are provided by way of example only and that the invention is not to be construed as being limited but only by proper scope of the following claims.

The invention claimed is:

1. A bulkhead for a wind turbine comprising:
    at least two access openings, each opening formed in a closable manner and including a hatch flap,
    wherein the wind turbine comprises:
        a rotor hub; and
        a rotor blade having a blade root,
    wherein the bulkhead is arranged in or on the blade root or in the area between the blade root and the rotor hub.

2. The bulkhead of claim 1, wherein at least one access opening is arranged between a center of the bulkhead and a peripheral edge of the bulkhead.

3. The bulkhead of claim 1, wherein the at least two access openings are arranged on a peripheral edge of the bulkhead.

4. The bulkhead of claim 3, wherein the at least two access openings are offset with respect to each other at a predetermined angle between 45° and 180°.

5. The bulkhead of claim 4, wherein the at least two access openings are arranged in an area of a nose of the rotor blade and/or in an area of a pressure side of the rotor blade and/or in an area of a suction side of the rotor blade and/or on a rear edge of the rotor blade.

6. The bulkhead of claim 5, wherein the bulkhead has a circular shape with a diameter greater than 2.0 m.

7. A rotor blade for a wind turbine comprising:
    a blade root; and
    a bulkhead having at least two access openings,
    wherein the at least two access openings include closable hatches and hatch flaps,
    wherein the rotor blade is operatively attached to a rotor hub of the wind turbine, and
    wherein the bulkhead is arranged in or on the blade root or in the area between the blade root and the rotor hub.

8. The rotor blade of claim 7, wherein at least one access opening is arranged between a center of the bulkhead and a peripheral edge of the bulkhead.

9. The rotor blade of claim 7, wherein the at least two access openings are arranged on a peripheral edge of the bulkhead.

10. The rotor blade of claim 9, wherein the at least two access openings are offset with respect to each other at a predetermined angle between 45° and 180°.

11. The rotor blade of claim 10, wherein the at least two access openings are arranged in an area of a nose of the rotor blade and/or in an area of a pressure side of the rotor blade and/or in an area of a suction side of the rotor blade and/or on a rear edge of the rotor blade.

12. The bulkhead of claim 11, wherein the bulkhead has a circular shape with a diameter greater than 2.0 m.

13. A wind turbine comprising:
    a rotor hub;
    a rotor blade having a blade root; and
    a bulkhead having multiple access openings each opening formed in a closable manner and including hatch flap,
    wherein the bulkhead is arranged in or on the blade root or in the area between the blade root and the rotor hub.

14. The wind turbine of claim 13, wherein the multiple access openings are arranged between a center of the bulkhead and a peripheral edge of the bulkhead.

15. The wind turbine of claim 14, wherein the multiple access openings are offset with respect to each other at a predetermined angle between 45° and 180°.

16. The wind turbine of claim 15, wherein the multiple access openings are arranged in an area of a nose of the rotor blade and/or in an area of a pressure side of the rotor blade and/or in an area of a suction side of the rotor blade and/or on a rear edge of the rotor blade.

17. The wind turbine of claim 16, wherein the bulkhead has a circular shape with a diameter greater than 2.0 m.

* * * * *